United States Patent
Fushiwaki et al.

(10) Patent No.: US 9,074,275 B2
(45) Date of Patent: Jul. 7, 2015

(54) GALVANIZED STEEL SHEET

(75) Inventors: Yusuke Fushiwaki, Fukuyama (JP); Yoshiharu Sugimoto, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 957 days.

(21) Appl. No.: 13/130,200

(22) PCT Filed: Nov. 25, 2009

(86) PCT No.: PCT/JP2009/070208
§ 371 (c)(1),
(2), (4) Date: May 19, 2011

(87) PCT Pub. No.: WO2010/061957
PCT Pub. Date: Jun. 3, 2010

(65) Prior Publication Data
US 2011/0217569 A1    Sep. 8, 2011

(30) Foreign Application Priority Data
Nov. 27, 2008    (JP) .................. 2008-301921

(51) Int. Cl.
| | | |
|---|---|---|
| *B32B 15/01* | (2006.01) | |
| *B32B 15/04* | (2006.01) | |
| *B32B 15/18* | (2006.01) | |
| *C23C 2/04* | (2006.01) | |
| *C23C 30/00* | (2006.01) | |
| *C22C 38/02* | (2006.01) | |
| *C22C 38/04* | (2006.01) | |
| *C22C 38/06* | (2006.01) | |
| *C23C 2/28* | (2006.01) | |
| *C23C 2/06* | (2006.01) | |

(52) U.S. Cl.
CPC ............ *C23C 2/04* (2013.01); *Y10T 428/12799* (2015.01); *Y10T 428/12972* (2015.01); *Y10T 428/273* (2015.01); *Y10T 428/27* (2015.01); *Y10T 428/12618* (2015.01); *C23C 30/005* (2013.01); *B32B 15/043* (2013.01); *B32B 15/18* (2013.01); *C23C 2/06* (2013.01); *C22C 38/02* (2013.01); *C22C 38/04* (2013.01); *C22C 38/06* (2013.01); *C23C 2/28* (2013.01)

(58) Field of Classification Search
CPC ...... B32B 15/01; B32B 15/012; B32B 15/04; B32B 15/043; B32B 15/18; C22C 38/02; C22C 38/04; C22C 38/06; C22C 2/04; C22C 2/06; C22C 2/28; C22C 30/00; C22C 30/005; Y10T 428/12799; Y10T 428/12618; Y10T 428/12972; Y10T 428/27; Y10T 428/273
USPC ......... 428/659, 629, 632, 633, 639, 684, 219, 428/215, 213, 332, 334, 335, 336, 349, 340
See application file for complete search history.

(56) References Cited

U.S. PATENT DOCUMENTS

| 7,074,497 B2 | 7/2006 | Suzuki et al. | |
|---|---|---|---|
| 7,695,826 B2 | 4/2010 | Tanaka et al. | |
| 2004/0234807 A1* | 11/2004 | Suzuki et al. | 428/659 |

FOREIGN PATENT DOCUMENTS

| EP | 1482066 | 12/2004 |
|---|---|---|
| EP | 1634975 | 3/2006 |
| JP | 08-246121 | 9/1996 |
| JP | 10-259466 | 9/1998 |
| JP | 2004-315960 | 11/2004 |
| JP | 2004-323970 | 11/2004 |
| JP | 2006-097094 | 4/2006 |
| JP | 2006-233333 | 9/2006 |
| WO | WO 03/074751 | 9/2003 |

OTHER PUBLICATIONS

Machine Translation, Fushiwaki Yusuke, JP 2006-097094 A, Apr. 2006.*
International Search Report, PCT/JP2009/070208, Dec. 28, 2009.
Supplementary European Search Report dated Jun. 12, 2014 in corresponding European Patent Application No. EP 09829195.8.

* cited by examiner

*Primary Examiner* — Michael E La Villa
(74) *Attorney, Agent, or Firm* — Young & Thompson

(57) ABSTRACT

A galvanized steel sheet includes a basal steel sheet (BSS) containing C: 0.01-0.15%, Si: 0.001-2.0%, Mn: 0.1-3.0%, Al: 0.001-1.0%, P: 0.005-0.060%, and S≤0.01% (% by mass), balance Fe and unavoidable impurities, with zinc plating layers on both sides of the BSS. One or more oxides selected from Fe, Si, Mn, Al, and P oxides are in steel sheet superficial portions in direct contact with the zinc plating layers and extending from each surface of the BSS to 100 µm deep. A crystalline oxide is in the regions from each surface of the BSS to 10 µm depth, which are also located in direct contact with the zinc plating layers, the crystalline oxide including Fe crystal grains within which Si and Mn atoms are distributed in the regions from grain boundaries to 1 µm deep inside the grain.

1 Claim, No Drawings

GALVANIZED STEEL SHEET

TECHNICAL FIELD

The present invention relates to a galvanized steel sheet that is made from a basal steel sheet containing Si and Mn and is highly processible and strong. Also, the present invention relates to a method for manufacturing such a galvanized steel sheet.

BACKGROUND ART

Recently, in industries including automobiles, home appliances, and construction materials, surface-treated steel sheets obtained by treating basal sheets to give antirust properties, in particular, galvanized steel sheets and alloyed galvanized steel sheets that can be manufactured at low cost and are excellent in antirust properties, have been used. Also, from the viewpoint of the improvement of the fuel efficiency and collision safety of automobiles, the demand has been growing for stronger materials for car bodies, thinner steel sheets based on such materials, and resultant lighter and stronger car bodies. To satisfy this demand, the use of high-strength steel sheets in automobiles has been promoted.

In general, galvanized steel sheets are manufactured by recrystallization annealing and subsequent galvanization of basal steel sheets, which are thin steel sheets obtained by hot-rolling or cold-rolling of steel slabs, in a continuous galvanizing line (hereinafter, referred to as CGL) equipped with an annealing furnace. As for alloyed galvanized steel sheets, the manufacturing process further includes alloying after galvanization.

Here, heating furnaces that can be used as the annealing furnace of CGLs include DFF-type ones (direct firing furnaces), NOF-type ones (non-oxidizing furnaces), all-radiant-tube-type ones, and so forth. Recently, however, CGLs equipped with an all-radiant-tube-type heating furnace have been favored for several reasons. For example, they are easy to operate, unlikely to cause pick-ups, and advantageous in other ways, thereby making it possible to manufacture high-quality plated steel sheets at low cost. Unfortunately, unlike DFF-type ones (direct firing furnaces) and NOF-type ones (non-oxidizing furnaces), all-radiant-tube-type heating furnaces do not support oxidizing before annealing and thus are disadvantageous to steel sheets containing Si, Mn, and/or other oxidizable elements in terms of the completeness of plating.

For exemplary methods for manufacturing hot-dipped steel sheets whose basal sheet is a high-strength steel sheet containing large amounts of Si and Mn, PTL 1 and PTL 2 have disclosed methods in which the heating temperature in a reduction furnace is specified for a higher dew point in accordance with its relation to the partial pressure of vapor so that the internal oxidization of the superficial portions of the basal sheet can take place. However, the resultant steel sheets, with oxides contained therein, are likely to crack during processing, inferior in the capability of retaining plating, and sometimes inferior in anticorrosive properties.

Also, PTL 3 has disclosed a method in which the concentration of $CO_2$ is specified besides those of gaseous oxidants, namely, $H_2O$ and $O_2$, so that the internal oxidization of the superficial portions of the basal sheet can take place just before plating and that the external oxidization can be prevented for an improved appearance of the resultant plating. However, as with those produced in accordance with PTLs 1 and 2, steel sheets produced in accordance with PTL 3 are likely to crack during processing because of oxides contained therein, inferior in the capability of retaining plating, and sometimes inferior in anticorrosive properties. Worse yet, $CO_2$ contaminates the furnace, induces the surfaces of steel sheets to be carburized, and leads to other unfavorable events, thereby causing problems such as varying mechanical properties of the resultant steel sheets.

Furthermore, recently, the use of high-strength galvanized steel sheets and high-strength alloyed galvanized steel sheets in components that are subject to heavy-handed processing has been promoted, and thus the capability of retaining plating during heavy-handed processing has become increasingly important. More specifically, plated steel sheets should be able to well retain plating even if they are bent at an angle greater than 90° and subsequently further bent to make a more acute angle or subjected to impact.

To satisfy these performance requirements, not only should a large amount of Si be added to steel to provide steel sheets with an intended structure but also the superficial portions of the basal steel sheet, namely, the portions located in direct contact with the plating layers, which may provide starting points of cracks and other kinds of defects during heavy-handed processing, should have a well-controlled structure. Unfortunately, known methods have all failed to provide an easy way to control the structure of the superficial portions of the basal steel sheet; with a CGL the annealing furnace of which is an all-radiant-tube-type heating furnace, it has been impossible to process Si-containing high-strength basal steel sheets into galvanized steel sheets that can retain plating even during heavy-handed processing.

CITATION LIST

PTL 1: Japanese Unexamined Patent Application Publication No. 2004-323970
PTL 2: Japanese Unexamined Patent Application Publication No. 2004-315960
PTL 3: Japanese Unexamined Patent Application Publication No. 2006-233333

SUMMARY OF INVENTION

Technical Problem

The present invention, which was made under the circumstances mentioned above, is intended to provide a galvanized steel sheet that is made from a basal steel sheet containing Si and Mn, excellent in the capability of retaining plating during heavy-handed processing, and highly strong, as well as to provide a method for manufacturing such a galvanized steel sheet.

Solution to Problem

The present invention can be described as follows.

[1] A galvanized steel sheet composed of a basal steel sheet containing elements C: 0.01 to 0.15%, Si: 0.001 to 2.0%, Mn: 0.1 to 3.0%, Al: 0.001 to 1.0%, P: 0.005 to 0.060%, and S≤0.01%, all in percent by mass, and Fe and unavoidable impurities as the balance; zinc plating layers formed on both sides of the basal steel sheet with the amount of plating per side in the range of 20 to 120 g/m²; one or more kinds of oxides selected from Fe, Si, Mn, Al, and P oxides and existing in steel sheet superficial portions, namely, the portions located in direct contact with the zinc plating layers and extending from each surface of the basal steel sheet to a depth of 100 μm, with the total amount of the oxides per side in the range of 0.01 to 0.5 g/m²; and a crystalline oxide existing in the regions from each surface of the basal steel sheet to a depth of 10 μm, which are also located in direct contact with the zinc plating layers, the crystalline oxide composed of Fe crystal grains in which Si and Mn atoms are so contained as to be distributed in the regions from grain boundaries to a depth of 1 μm.

[2] A galvanized steel sheet composed of a basal steel sheet containing elements C: 0.01 to 0.15%, Si: 0.001 to 2.0%, Mn: 0.1 to 3.0%, Al: 0.001 to 1.0%, P: 0.005 to 0.060%, S≤0.01%, and one or more kinds of elements selected from B: 0.001 to 0.005%, Nb: 0.005 to 0.05%, Ti: 0.005 to 0.05%, Cr: 0.001 to 1.0%, Mo: 0.05 to 1.0%, Cu: 0.05 to 1.0%, and Ni: 0.05 to 1.0%, all in percent by mass, and Fe and unavoidable impurities as the balance; zinc plating layers formed on both sides of the basal steel sheet with the amount of plating per side in the range of 20 to 120 g/m$^2$; one or more kinds of oxides selected from Fe, Si, Mn, Al, P, B, Nb, Ti, Cr, Mo, Cu, and Ni oxides and existing in steel sheet superficial portions, namely, the portions located in direct contact with the zinc plating layers and extending from each surface of the basal steel sheet to a depth of 100 μm, with the total amount of the oxides per side in the range of 0.01 to 0.5 g/m$^2$; and a crystalline oxide existing in the regions from each surface of the basal steel sheet to a depth of 10 μm, which are also located in direct contact with the zinc plating layers, the crystalline oxide composed of Fe crystal grains in which Si and Mn atoms are so contained as to be distributed in the regions from grain boundaries to a depth of 1 μm.

[3] A method for manufacturing a galvanized steel sheet, including annealing and galvanizing the steel sheet mentioned in [1] or [2] above in a continuous galvanizing line with galvanization conditions controlled so that the partial pressure of atmospheric oxygen (Po$_2$) should satisfy Equation (1) below when the temperature in the annealing furnace is between 600° C. and 900° C., inclusive:

$$-12+0.5\times[Si]+0.2\times[Mn]\leq \text{Log } Po_2 \leq -4 \quad (1)$$

where [Si] and [Mn] represent the content ratio of Si and that of Mn in steel (mass %), respectively, and Po$_2$ the partial pressure of oxygen (Pa).

[4] The method for manufacturing a galvanized steel sheet according to [3] above, further including, after galvanization, alloying the steel sheet by heating it at a temperature between 450° C. and 550° C., inclusive, until the content ratio of Fe in the zinc plating layers is in the range of 7 to 15 mass %.

[5] A high-strength galvanized steel sheet composed of a basal steel sheet containing elements C: 0.01 to 0.15%, Si: 0.001 to 2.0%, Mn: 0.1 to 3.0%, Al: 0.001 to 1.0%, P: 0.005 to 0.060%, and S≤0.01%, all in percent by mass, and Fe and unavoidable impurities as the balance; zinc plating layers formed on both sides of the basal steel sheet with the amount of plating per side in the range of 20 to 120 g/m$^2$; one or more kinds of oxides selected from Fe, Si, Mn, Al, and P oxides and existing in steel sheet superficial portions, namely, the portions located in direct contact with the zinc plating layers and extending from each surface of the basal steel sheet to a depth of 100 μm, with the total amount of the oxides per side in the range of 0.01 to 0.5 g/m$^2$; and a Si-and-Mn-based crystalline complex oxide existing in the regions from each surface of the basal steel sheet to a depth of 10 μm, which are also located in direct contact with the zinc plating layers, the Si-and-Mn-based crystalline complex oxide composed of basal iron grains in which Si and Mn atoms are so contained as to be distributed in the regions from grain boundaries to a depth of 1 μm.

Advantageous Effects of Invention

The present invention provides galvanized steel sheets that are excellent in the capability of retaining plating during heavy-handed processing and highly strong.

DESCRIPTION OF EMBODIMENTS

In known methods, internal oxidation is triggered simply by increasing the partial pressure of vapor for a higher dew point; thus, as mentioned above, the resultant steel sheets are likely to crack during processing and inferior in the capability of retaining plating. Therefore, the inventors, getting rid of the old way of thinking, sought a whole new solution to these problems and finally found that a more sophisticated way of controlling the structure of the superficial portions of the basal steel sheet, which may provide starting points of cracks and other kinds of defects during heavy-handed processing, would allow obtaining galvanized steel sheets that are excellent in the capability of retaining plating during heavy-handed processing and highly strong. More specifically, the type of gas and the degree of temperature for annealing are appropriately specified to provide a structure in which one or more kinds of oxides selected from Fe, Si, Mn, Al, and P oxides (the options may further include B, Nb, Ti, Cr, Mo, Cu, and Ni oxides) are formed in steel sheet superficial portions, namely, the portions located in direct contact with the resultant plating layers and extending from each surface of the basal steel sheet to a depth of 100 μm, with the total amount of the oxides per side in the range of 0.01 to 0.5 g/m$^2$, and a crystalline oxide is formed in the regions from the bottom of each plating layer to a depth of 10 μm. This crystalline oxide is composed of Fe crystal grains (also referred to as "basal iron grains") in which Si and Mn atoms are so contained as to be distributed in the regions from grain boundaries to a depth of 1 μm. (The crystalline oxide is also referred to as a "Si-and-Mn-based crystalline complex oxide.") As a result, the superficial portions of the basal steel sheet (also referred to as "basal iron superficial portions") can be bent with stress relaxed and cracks prevented, and thus the resultant galvanized steel sheet is excellent in the capability of retaining plating during heavy-handed processing.

Note that in the present invention the high-strength galvanized steel sheet represents a steel sheet whose tensile strength, TS, is equal to or higher than 340 MPa. Also, the high-strength galvanized steel sheet according to the present invention includes both galvanized steel sheets not alloyed after galvanization (also referred to as GI steel sheets hereinafter) and galvanized steel sheets alloyed after galvanization (also referred to as GA steel sheets hereinafter).

The following describes the present invention more specifically. Note that in the following description the content ratios of elements used to specify the steel composition and those used to specify the plating layer composition all have a unit "mass %" unless otherwise noted; however, they are expressed simply by "%" hereinafter.

First, the steel composition is detailed.

C: 0.01 to 0.15%

As a constituent of the structure of steel, C forms martensite to make the steel more processible. To this end, the content ratio of C should be at least 0.01%. However, C contained at any content ratio exceeding 0.15% leads to a reduced level of weldability. Therefore, the content ratio of C should be between 0.01% and 0.15%, inclusive.

Si: 0.001 to 2.0%

Si is an element effective in reinforcing steel to provide a material of high usefulness. For the level of strength intended in the present invention, the content ratio of Si should be at least 0.001%. With any content ratio of Si less than 0.001%, the resultant strength deviates from its range intended in the present invention, and there are no problems with the capability of the steel sheet to retain plating during heavy-handed processing. With any content ratio of Si exceeding 2.0%, however, it is difficult to make the steel sheet more capable of retaining plating during heavy-handed processing. Therefore, the content ratio of Si should be between 0.001% and 2.0%, inclusive.

Mn: 0.1 to 3.0%

Mn is an element effective in reinforcing steel. For certain mechanical properties and a certain level of strength, Mn should be contained at a content ratio of at least 0.1%. With any content ratio of Mn exceeding 3.0%, however, it is difficult to achieve certain levels of weldability and adhesion to plating and well-balanced strength and ductility. Therefore, the content ratio of Mn should be between 0.1% and 3.0%, inclusive.

Al: 0.001 to 1.0%

Al is an element that is thermodynamically more oxidizable than Si and Mn and thus forms a complex oxide with Si and Mn. In a basal steel sheet (also referred to as "basal iron") containing Al, the internal oxidization of Si and Mn in the regions located in direct contact with the superficial portions of the steel sheet proceeds faster than in one containing no Al. For this effect to be exercised, the content ratio of Al should be at least 0.001%. However, Al contained at any content ratio exceeding 0.1% leads to cost increase. Therefore, the content ratio of Al should be between 0.001% and 1.0%, inclusive.

P: 0.005 to 0.060%

P is one of the elements unavoidably contained.

Reducing the content ratio of P to less than 0.005% is a costly task, and thus the content ratio of P should be at least 0.005%. However, P contained at any content ratio exceeding 0.060% leads to reduced levels of weldability and surface quality. Worse yet, when alloying is omitted, it leads to a weaker adhesion to plating; when alloying is performed, however, it necessitates the alloying temperature to be increased for an intended degree of alloying. Increasing the alloying temperature for an intended degree of alloying leads to a reduced level of ductility and a weaker adhesion to alloyed plating; it is impossible to achieve an intended degree of alloying, favorable ductility, and favorable quality of the alloyed plating at the same time. Therefore, the content ratio of P should be between 0.005% and 0.060%, inclusive.

S≤0.01%

Si is one of the elements unavoidably contained. Although its lower limit is not specified, the content ratio of S is preferably equal to or lower than 0.01% because too high a content ratio of S leads to a reduced level of weldability.

Additionally, if necessary for a more controlled balance of strength and ductility, one or more elements selected from the following may be added: B: 0.001 to 0.005%; Nb: 0.005 to 0.05%; Ti: 0.005 to 0.05%; Cr: 0.001 to 1.0%; Mo: 0.05 to 1.0%; Cu: 0.05 to 1.0%; Ni: 0.005 to 1.0%. Of these elements, Cr, Mo, Nb, Cu, and Ni, which may be added singly or in combination or two or more of them, have the effects of promoting the internal oxidization of Si and preventing Si from concentrating at the surfaces of the steel sheet if the annealing atmosphere is a kind of wet gas such as one containing $H_2O$ in a relatively large proportion, and thus may be added for a favorable adhesion of the steel sheet to the plating formed on it, not for improved mechanical properties. The following describes the grounds for specifying the content ratio ranges of these elements as above.

B: 0.001 to 0.005%

When contained at any content ratio lower than 0.001%, B hardly has the effect of facilitating quenching. However, B contained at any content ratio exceeding 0.005% leads to a weaker adhesion to plating. Therefore, B should have a content ratio between 0.001% and 0.005%, inclusive, if it is contained. However, of course, the addition of B may be unnecessary in the case where the mechanical properties of the steel sheet are sufficient and need not be improved any more.

Nb: 0.005 to 0.05%

When contained at any content ratio lower than 0.005%, Nb hardly has the effect of controlling strength and the effect of improving adhesion to plating that should be exercised if Nb is added in combination with Mo. However, Nb contained at any content ratio exceeding 0.05% leads to cost increase. Therefore, Nb should have a content ratio between 0.005% and 0.05%, inclusive, if it is contained.

Ti: 0.005 to 0.05%

When contained at any content ratio lower than 0.005%, Ti hardly has the effect of controlling strength. However, Ti contained at any content ratio exceeding 0.05% leads to a weaker adhesion to plating. Therefore, Ti should have a content ratio between 0.005% and 0.05%, inclusive, if it is contained.

Cr: 0.001 to 1.0%

When contained at any content ratio lower than 0.001, Cr hardly has a favorable performance for quenching and the effect of promoting internal oxidization that should be exercised if the annealing atmosphere is a kind of wet gas such as one containing $H_2O$ in a relatively large proportion. However, Cr contained at any content ratio exceeding 1.0% concentrates at the surfaces of the steel sheet, thereby causing a weaker adhesion to plating and a reduced level of weldability. Therefore, Cr should have a content ratio between 0.001% and 1.0%, inclusive, if it is contained.

Mo: 0.05 to 1.0%

When contained at any content ratio lower than 0.05%, Mo hardly has the effect of controlling strength and the effect of improving adhesion to plating that should be exercised if Mo is added in combination with Nb, Ni, and/or Cu. However, Mo contained at any content ratio exceeding 1.0% leads to cost increase. Therefore, Mo should have a content ratio between 0.05% and 1.0%, inclusive, if it is contained.

Cu: 0.05 to 1.0%

When contained at any content ratio lower than 0.05%, Cu hardly has the effect of promoting the formation of retained austenite and the effect of improving adhesion to plating that should be exercised if Cu is added in combination with Ni and/or Mo. However, Cu contained at any content ratio exceeding 1.0% leads to cost increase. Therefore, Cu should have a content ratio between 0.05% and 1.0%, inclusive, if it is contained.

Ni: 0.05 to 1.0%

When contained at any content ratio lower than 0.05%, Ni hardly has the effect of promoting the formation of retained austenite and the effect of improving adhesion to plating that should be exercised if Ni is added in combination with Cu and/or Mo. However, Ni contained at any content ratio exceeding 1.0% leads to cost increase. Therefore, Ni should have a content ratio between 0.05% and 1.0%, inclusive, if it is contained.

The balance, namely, the constituents other than those describe above, are Fe and unavoidable impurities.

The following describes the most important requirement of the present invention, namely, the structure of the superficial portions of the basal steel sheet, which are located in direct contact with the plating layers.

For galvanized steel sheets in which steel contains large amounts of Si and Mn added thereto to be sufficiently capable of retaining plating during heavy-handed processing, the superficial portions of the basal steel sheet, namely, the portions located in direct contact with the plating layers, which may provide starting points of cracks and other kinds of defects during heavy-handed processing, should have a well-controlled structure.

In the present invention, specific measures taken to this end are as follows. First, for the completeness of plating, the annealing conditions are controlled to give an increased oxygen potential. This increased oxygen potential allows Si, Mn, and other oxidizable elements to undergo internal oxidation in advance, just before plating, and Si and Mn located in the superficial portions of the basal steel sheet lose their activity to some extent. At the same time, these elements are prevented from undergoing external oxidation; as a result, the basal steel sheet is completely plated and becomes more capable of retaining plating. In addition, this improvement effect can be obtained by forming one or more kinds of oxides selected from Fe, Si, Mn, Al, P, B, Nb, Ti, Cr, Mo, Cu, and Ni oxides in steel sheet superficial portions, namely, the portions located in direct contact with the zinc plating layers and extending from each surface of the basal steel sheet to a depth of 100 µm, with the amount of the oxides per side set at 0.01 g/m$^2$ or larger. With any amount of the oxides per side equal to or larger than 0.5 g/m$^2$, however, the effect of the oxides plateaus. Therefore, the upper limit of the amount of the oxides is 0.5 g/m$^2$.

In addition, the total amount of the oxides described above (hereinafter, referred to as "the degree of internal oxidization") can be measured by the "impulse furnace fusion/infrared absorption spectrometry." This method, however, requires the subtraction of the amount of oxygen contained in the basal material (i.e., a high-tensile steel sheet that has not been annealed yet). In the present invention, therefore, a high-tensile steel sheet is polished on both sides after rounds of annealing until 100 µm or a greater thickness of the superficial portions are removed, the resultant steel sheet is then subjected to the measurement of the concentration of oxygen in steel (the measured concentration is named the basal material oxygen amount OH), and separately the high-tensile steel sheet is subjected to the measurement of the concentration of oxygen in steel along the entire thickness thereof just after the rounds of annealing (the measured concentration is named the post-internal-oxidization oxygen amount OI). The post-internal-oxidization oxygen amount of the high-tensile steel sheet, OI, and the basal material oxygen amount, OH, obtained in this way are used to calculate the difference between OI and OH (=OI−OH), and this difference is converted into the amount per unit area (i.e., 1 m$^2$) per side (g/m$^2$). The obtained value is used as the degree of internal oxidization.

Note that in the present invention the presence of the above-described oxides in steel sheet superficial portions, namely, the portions located in direct contact with the plating layers and extending from each surface of the basal steel sheet to a depth of 100 µm, allows the steel sheet to have an improved capability of retaining plating. This means that there are no problems even if the oxides grow to reach any depth exceeding 100 µm from the bottom of either or both plating layers (the boundaries between the plating and the basal steel sheet). However, a high heating temperature is needed to allow the oxides to grow to reach any depth exceeding 100 µm; it is difficult to do so while achieving certain levels of mechanical properties.

Then, in the present invention, a crystalline oxide is formed in the regions from each surface of the basal steel sheet to a depth of 10 µm, which are also located in direct contact with the zinc plating layers, and this crystalline oxide is composed of Fe crystal grains in which Si and Mn atoms are so contained as to be distributed in the regions from grain boundaries to a depth of 1 µm.

If this internal oxide exists only in grain boundaries and does not so inside grains, the oxidizable elements in steel cannot be sufficiently prevented from diffusing inside the grains in some cases, although they can be prevented from diffusing in the grain boundaries. This means that internal oxidization should take place not only in grain boundaries but also inside grains. More specifically, it is required that a crystalline oxide that is composed of Fe crystal grains in which Si and Mn atoms are so contained as to be distributed in the regions from grain boundaries to a depth of 1 µm is formed in the regions from each surface of the basal steel sheet to a depth of 10 µm. The presence of an oxide inside basal iron grains limits the amounts of Si and Mn dissolved inside the basal iron grains near the oxide. As a result, Si and Mn atoms are prevented from diffusing inside the basal iron grains and accordingly from concentrating at the surfaces of the basal steel sheet.

Note that there are no problems even if the crystalline oxide that is composed of Fe crystal grains in which Si and Mn atoms are so contained as to be distributed in the regions from grain boundaries to a depth of 1 µm grows to reach any depth exceeding 10 µm from the surfaces of the basal steel sheet. However, the upper limit of depth is set at 10 µm for each region in which the Si-and-Mn-based crystalline complex oxide in which Si and Mn atoms are so contained as to be distributed in the regions from grain boundaries to a depth of 1 µm is formed; with any depth of the region exceeding 10 µm, the effect of making the steel sheet more capable of retaining plating plateaus. Also, there are no problems even if the crystalline oxide that is composed of Fe crystal grains in which Si and Mn atoms are so contained as to be distributed in the regions from grain boundaries to a depth exceeding 1 µm. However, the upper limit of the depth from grain boundaries was set at 1 µm; with any depth from grain boundaries exceeding 1 µm, the effect of making the steel sheet more capable of retaining plating plateaus.

In the present invention, therefore, one or more kinds of oxides selected from Fe, Si, Mn, Al, P, B, Nb, Ti, Cr, Mo, Cu, and Ni oxides are formed in steel sheet superficial portions, namely, the portions located in direct contact with the resultant plating layers and extending from each surface of the basal steel sheet to a depth of 100 µm, with the total amount of the oxides per side in the range of 0.01 to 0.5 g/m$^2$, and a crystalline oxide that is composed of Fe crystal grains in which Si and Mn atoms are so contained as to be distributed in the regions from grain boundaries to a depth of 1 µm is formed in the regions from each surface of the basal steel sheet to a depth of 10 µm, which are also located in direct contact with the plating layers.

To do so, namely, to form one or more kinds of oxides selected from Fe, Si, Mn, Al, P, B, Nb, Ti, Cr, Mo, Cu, and Ni oxides in steel sheets superficial portions, namely, the portions located in direct contact with the resultant plating layers and extending from each surface of the basal steel sheet to a depth of 100 µm, with the total amount of the oxides per side in the range of 0.01 to 0.5 g/m$^2$ and to form a crystalline oxide that is composed of Fe crystal grains in which Si and Mn atoms are so contained as to be distributed in the regions from grain boundaries to a depth of 1 μm in the regions from the bottom of each plating layer to a depth of 10 μm, the basal steel sheet should be annealed and galvanized in a CGL equipped with an all-radiant-tube-type heating furnace with galvanization conditions controlled so that the partial pressure of atmospheric oxygen ($Po_2$) should satisfy Equation (1) below when the temperature in the annealing furnace is in the range between 600° C. and 900° C., inclusive:

$$-12+0.5\times[Si]+0.2\times[Mn] \leq \text{Log } Po_2 \leq -4 \quad (1)$$

where [Si] and [Mn] represent the content ratio of Si and that of Mn in steel (mass %), respectively, and $Po_2$ the partial pressure of oxygen (Pa).

At any temperature lower than 600° C., incomplete internal oxidation reaction results. At any temperature equal to or higher than 900° C., however, it is difficult to complete the internal oxidation reaction while ensuring the high quality of the resultant material. Therefore, the temperature at which the partial pressure of atmospheric oxygen ($Po_2$) is controlled to satisfy the equation presented above should be between 600° C. and 900° C., inclusive.

Under the same annealing conditions, the amount of Si (and/or Mn) concentrating at the surfaces of the basal steel sheet increases in proportion to the amount of Si (and/or Mn) in steel. In a single kind of steel, there is a tendency for Si (and/or Mn) existing in steel to undergo internal oxidation if the atmospheric oxygen potential is relatively high; thus, the amount of Si (and/or Mn) concentrating at the surfaces of the basal steel sheet decreases as the atmospheric oxygen potential increases. Therefore, the atmospheric oxygen potential should be increased in proportion to the amount of Si (and/or Mn) in steel. Laboratory experiments have revealed that the proportionality factor is 0.5 for the amount of Si in steel and 0.2 for the amount of Mn in steel and that the intercept is −12. Based on these findings, in the present invention, the upper and lower limits of Log $Po_2$ are set at −4 and $-12+0.5\times[Si]+0.2\times[Mn]$, respectively. Any conditions under which Log $Po_2$ is lower than $-12+0.5\times[Si]+0.2\times[Mn]$ leads to incomplete internal oxidation. On the other hand, any conditions under which Log $Po_2$ exceeds −4 cause no problems. However, such conditions lead to an increased cost of controlling the atmosphere, and a sufficient degree of internal oxidation can be ensured even under milder conditions; therefore, the upper limit of Log $Po_2$ is set at −4.

Note that Log $Po_2$ can be calculated by equilibrium calculations from the controlled values of the concentrations of $H_2O$ and $H_2$ derived from the dew point. It is thus preferable that Log $Po_2$ is controlled by the control of the concentrations of $H_2O$ and $H_2$, not by the direct measurement of Log $Po_2$. Log $Po_2$ can be calculated by Equation (2) below:

$$Po_2=(PH_2O/PH_2)^2\times\exp(\Delta G/RT) \quad (2)$$

($\Delta G$: Gibbs free energy; R: gas constant; T: temperature).

Any method may be used to derive the concentrations of $H_2O$ and $H_2$ from the dew point with no particular limitation. Typical methods include one in which a certain amount of gas is sampled, the dew point of the sample is measured in a dew-point meter (e.g., Due Cup), and then the partial pressure of $H_2O$ is determined; one in which the concentration of $H_2$ is measured in a commercially available $H_2$ meter; and one in which the pressure of the atmosphere is measured and then the partial pressures of $H_2O$ and $H_2$ are determined in accordance with the proportions of these two kinds of gas.

If $Po_2$ is high, $N_2$—$H_2$ gas is introduced to decrease the dew point, or the concentration of the $H_2$ gas is increased. If $Po_2$ is low, however, vaporous $N_2$—$H_2$ gas is introduced to increase the dew point, or a slight amount of $O_2$ gas is added.

Additionally, in the present invention, the portions of the basal steel sheet in which the Si-and-Mn-based crystalline complex oxide grows are preferably composed of ferrite, which is soft and processible, for an improved capability of retaining plating.

Furthermore, in the present invention, the steel sheet has zinc plating layers formed on both sides thereof with the amount of plating per side in the range of 20 to 120 g/m². With any amount of plating per side less than 20 g/m², it is difficult to ensure acceptable levels of anticorrosive properties. With any amount of plating per side exceeding 120 g/m², however, the capability of retaining plating is reduced.

As for alloying, in which a galvanized steel sheet is heated at a temperature between 450° C. and 550° C., inclusive, the degree of alloying is preferably in the range of 7 to 15%. Any degree of alloying smaller than 7% leads to nonuniform alloying and a reduced level of resistance to flaking. Any degree of alloying exceeding 15%, however, leads to a reduced capability of retaining plating.

The following describes a method for manufacturing a galvanized steel sheet according to the present invention and the grounds for specifying the manufacturing method as below.

After a block of steel having the above-described chemical composition is hot-rolled, the resultant steel sheet is cold-rolled at a reduction rate in the range of 40 to 80%, and then annealed and galvanized in a continuous galvanizing line equipped with an all-radiant-tube-type heating furnace. Galvanization should be performed in such a manner that the partial pressure of atmospheric oxygen ($Po_2$) should satisfy Equation (1) below when the temperature in the annealing furnace is between 600° C. and 900° C., inclusive. This is the most important requirement of the present invention. Once the partial pressure of atmospheric oxygen ($Po_2$) is controlled during annealing and/or galvanization in the way described above, the oxygen potential is increased, and this increased oxygen potential allows Si, Mn, and other oxidizable elements to undergo internal oxidation in advance, just before plating, and Si and Mn located in the superficial portions of the basal steel sheet lose their activity to some extent. At the same time, these elements are prevented from undergoing external oxidation; as a result, the basal steel sheet is completely plated and becomes more capable of retaining plating.

$$-12+0.5\times[Si]+0.2\times[Mn] \leq \text{Log } Po_2 \leq -4 \quad (1)$$

where [Si] and [Mn] represent the content ratio of Si and that of Mn in steel (mass %), respectively, and $Po_2$ the partial pressure of oxygen (Pa).

For hot rolling, any set of conditions may be used with no particular limitation.

After hot rolling, the resultant steel sheet is preferably washed in an acid so that mill scales are removed from the surfaces of the steel sheet; then, the steel sheet proceeds to cold rolling.

The reduction rate for cold rolling should be between 40% and 80%, inclusive. If the reduction rate is lower than 40%, the resultant steel sheet often has reduced levels of mechanical properties owing to a reduced recrystallization temperature. If the reduction rate exceeds 80%, however, not only is rolling a costly task because of the high strength of the steel sheet, but also some of the elements contained in the steel sheet concentrate at the surfaces of the steel sheet during annealing, thereby making the steel sheet difficult to plate.

The cold-rolled steel sheet is then annealed in a CGL the annealing furnace of which is an all-radiant-tube-type heating furnace, then galvanized, and then optionally alloyed.

This all-radiant-tube-type heating furnace is used to perform heating and soaking. In heating, the heating zone, namely, the anterior compartment of the heating furnace, is used to heat the steel sheet to a certain temperature. In soaking, the soaking zone, namely, the posterior compartment of the heating furnace, is used to keep the steel sheet at a certain temperature for a certain period of time.

To form one or more kinds of oxides selected from Fe, Si, Mn, Al, P, B, Nb, Ti, Cr, Mo, Cu, and Ni oxides in steel sheet superficial portions, namely, the portions extending from each surface of the basal steel sheet to a depth of 100 μm, with the total amount of the oxides per side in the range of 0.01 to 0.5 g/m$^2$ and to form a crystalline oxide that is composed of Fe crystal grains in which Si and Mn atoms are so contained as to be distributed in the regions from grain boundaries to a depth of 1 μm in the regions from each surface of the basal steel sheet to a depth of 10 μm, which are also located in direct contact with the plating layers, as described above, the basal steel sheet should be galvanized in such a manner that the partial pressure of atmospheric oxygen (Po$_2$) should satisfy Equation (1) below when the temperature in the annealing furnace is between 600° C. and 900° C., inclusive. To this end, some measures may be taken; for example, if Po$_2$ in the CGL is high, N$_2$—H$_2$ gas is introduced to decrease the dew point, or the concentration of the H$_2$ gas is increased, and if Po$_2$ in the CGL is low, vaporous N$_2$—H$_2$ gas is introduced to increase the dew point, or a slight amount of O$_2$ gas is added. Through these operations, the concentrations of H$_2$O and H$_2$ are controlled, and Log Po$_2$ is accordingly controlled.

$$-12+0.5\times[Si]+0.2\times[Mn]\leq Log\ Po_2 \leq -4 \quad (1)$$

where [Si] and [Mn] represent the content ratio of Si and that of Mn in steel (mass %), respectively, and Po$_2$ the partial pressure of oxygen (Pa).

Note that if the volume fraction of H$_2$ is lower than 10%, the activation effect based on chemical reduction cannot be exercised, and thus the resultant steel sheet has a reduced capability of retaining plating. The upper limit is not specified; however, increasing the volume fraction of H$_2$ to exceed 75% is a costly task, and the effect of the addition of H$_2$ plateaus once the volume fraction of H$_2$ reaches 75%. In terms of cost, therefore, the volume fraction of H$_2$ is preferably equal to or lower than 75%.

Galvanization may be performed by any of the ordinary methods.

If alloying is performed after galvanization, a galvanized steel sheet is heated at a temperature between 450° C. and 550° C., inclusive, to be alloyed; the content ratio of Fe contained in the resultant plating layers is preferably in the range of 7 to 15 mass %.

EXAMPLES

The following describes the present invention in more detail with reference to examples.

The hot-rolled steel sheets made in accordance with the steel compositions specified in Table 1 were washed in an acid until mill scales were removed. The obtained steel sheets were then cold-rolled under the conditions specified in Table 2 into steel sheets each having a thickness of 1.0 mm.

TABLE 1

| Steel No. | C | Si | Mn | Al | P | S | Cr | Mo | B | Nb | Cu | Ni | Ti |
|---|---|---|---|---|---|---|---|---|---|---|---|---|---|
| A | 0.02 | 0.2 | 1.9 | 0.03 | 0.01 | 0.004 | — | — | — | — | — | — | — |
| B | 0.05 | 0.2 | 2.0 | 0.03 | 0.01 | 0.004 | — | — | — | — | — | — | — |
| C | 0.15 | 0.2 | 2.1 | 0.03 | 0.01 | 0.004 | — | — | — | — | — | — | — |
| D | 0.05 | 1.0 | 2.0 | 0.03 | 0.01 | 0.004 | — | — | — | — | — | — | — |
| E | 0.05 | 1.9 | 2.1 | 0.03 | 0.01 | 0.004 | — | — | — | — | — | — | — |
| F | 0.05 | 0.2 | 2.9 | 0.03 | 0.01 | 0.004 | — | — | — | — | — | — | — |
| G | 0.05 | 0.2 | 2.0 | 0.9 | 0.01 | 0.004 | — | — | — | — | — | — | — |
| H | 0.05 | 0.2 | 2.1 | 0.03 | 0.05 | 0.004 | — | — | — | — | — | — | — |
| I | 0.05 | 0.2 | 1.9 | 0.03 | 0.01 | 0.009 | — | — | — | — | — | — | — |
| J | 0.05 | 0.2 | 1.9 | 0.02 | 0.01 | 0.004 | 0.8 | — | — | — | — | — | — |
| K | 0.05 | 0.2 | 1.9 | 0.03 | 0.01 | 0.004 | — | 0.1 | — | — | — | — | — |
| L | 0.05 | 0.2 | 2.2 | 0.03 | 0.01 | 0.004 | — | — | 0.003 | — | — | — | — |
| M | 0.05 | 0.2 | 2.0 | 0.05 | 0.01 | 0.004 | — | — | 0.001 | 0.03 | — | — | — |
| N | 0.05 | 0.2 | 1.9 | 0.03 | 0.01 | 0.004 | — | 0.1 | — | — | 0.1 | 0.2 | — |
| O | 0.05 | 0.2 | 1.9 | 0.04 | 0.01 | 0.004 | — | — | 0.001 | — | — | — | 0.02 |
| P | 0.05 | 0.2 | 1.9 | 0.03 | 0.01 | 0.004 | — | — | — | — | — | — | 0.05 |
| Q | 0.16 | 0.2 | 2.2 | 0.03 | 0.01 | 0.004 | — | — | — | — | — | — | — |
| R | 0.02 | 2.1 | 2.0 | 0.03 | 0.01 | 0.004 | — | — | — | — | — | — | — |
| S | 0.02 | 0.2 | 3.1 | 0.03 | 0.01 | 0.004 | — | — | — | — | — | — | — |
| T | 0.02 | 0.2 | 1.9 | 1.1 | 0.01 | 0.004 | — | — | — | — | — | — | — |
| U | 0.02 | 0.2 | 1.9 | 0.03 | 0.07 | 0.004 | — | — | — | — | — | — | — |
| V | 0.02 | 0.2 | 1.9 | 0.03 | 0.01 | 0.02 | — | — | — | — | — | — | — |

(Mass %)

The cold-rolled steel sheets obtained in the way described above were set inside a CGL the annealing furnace of which was an all-radiant-tube-type heating furnace. The steel sheets were then threaded through the CGL with Po$_2$ of the annealing atmosphere controlled as specified in Table 2, then annealed by being heated to 850° C. in the heating zone and kept at 850° C. in the soaking zone, and subsequently galvanized in an Al-containing Zn bath at 460° C. The atmosphere in the annealing furnace, including the heating furnace and the soaking furnace, can be considered to have been substantially uniform. Note that the partial pressure of oxygen and the degree of temperature were measured in a volume of the atmospheric gas sampled from the central portion of the annealing furnace (actually, the portion located 1 m up from the furnace bottom and on the operation unit side (Op side)).

As for the control of the dew point of the atmosphere, an independent set of piping was built in advance to allow flowing of vaporous N$_2$ gas, which was obtained by heating a water tank placed in N$_2$, then H$_2$ gas was introduced and mixed with the vaporous N$_2$ gas, and subsequently the mixed gas was introduced into the furnace; in this way, the dew point of the atmosphere was controlled. H$_2$% of the atmosphere was controlled by regulating the amount of the $H_2$ gas introduced into the $N_2$ gas using a gas valve.

The GA steel sheets were formed in a Zn bath containing Al at 0.14%, and the GI ones in a Zn bath containing Al at 0.18%. The amount of plating was adjusted to 40 g/m², 70 g/m², or 140 g/m² (the amount of plating per side) by gas wiping. GA means that the steel sheets were alloyed.

The galvanized steel sheets (GA and GI ones) obtained in the way described above were evaluated for beauty in appearance (plating appearance), capability of retaining plating during heavy-handed processing, and processibility, and then subjected to the measurement of the degree of internal oxidization, namely, the amount of oxides in the superficial portions of their own basal steel sheet, which were located in direct contact with the plating layers and had a thickness of 100 μm, then the characterization of the crystalline oxide containing Si and Mn and existing in the surfaces of their own basal steel sheet, which were also located in direct contact with the plating layers and had a thickness of 10 μm, for its crystallographic form and site of growth, and subsequently the determination of the depositions in grains beneath the plating layers in the regions from grain boundaries to a depth of 1 μm. The measurement methods and acceptance criteria used are described below.

<Beauty in Appearance>

The beauty in appearance was judged to be favorable (symbol: ○) if no defects in appearance such as incomplete plating or nonuniform alloying were found, and poor (symbol: x) if any such defect was found.

<Capability of Retaining Plating>

For the capability of retaining plating during heavy-handed processing, it is required for GA steel sheets that the plated steel sheets should be able to well retain plating even if they were bent at an angle greater than 90° and subsequently further bent to make a more acute angle. In this series of examples and comparative examples, each of the relevant steel sheets was bent at an angle of 120°, a piece of adhesive tape was attached to the bent portion and removed, and then the amount of detached plating per unit length was determined as the number of Zn counts measured by X-ray fluorescence analysis. Then, the galvanized steel sheets were classified in accordance with the grading presented below and judged to be conforming in terms of the capability of retaining plating (symbol: ○) if the grade was 1 or 2, and nonconforming (symbol: x) if the grade was 3 or worse.

Zn counts in X-ray fluorescence analysis: Grade 0 to <500: 1 (Best)
≥500 to <1000: 2
≥1000 to <2000: 3
≥2000 to <3000: 4
≥3000: 5 (Worst)

For GI steel sheets, it is required that plating should be retained during impact test. Each of the relevant steel sheets was subjected to ball impact test, then a piece of tape was attached to the damaged portion and removed, and subsequently the steel sheets were visually inspected for detached plating layers.

○: No detachment of plating layers observed
x: Some portion of plating layers detached <Processibility>

As for processibility, JIS No. 5 test specimens were prepared, and the tensile strength (TS (MPa)) and the percent elongation (El (%)) were measured in them. Galvanized steel sheets the test specimen obtained from which had a value of TS×El equal to or greater than 22000 were judged to be conforming, and ones the test specimen obtained from which had a value of TS×El smaller than 22000 were judged to be nonconforming.

<Degree of Internal Oxidization>

The degree of internal oxidization is measured by the "impulse furnace fusion/infrared absorption spectrometry." This method, however, requires the subtraction of the amount of oxygen contained in the basal material (i.e., a high-tensile steel sheet that has not been annealed yet). In the present invention, therefore, each high-tensile steel sheet was polished on both sides after rounds of annealing until 100 μm or a greater thickness of the superficial portions were removed, the resultant steel sheet was then subjected to the measurement of the concentration of oxygen in steel (the measured concentration was named the basal material oxygen amount OH), and separately the high-tensile steel sheet was subjected to the measurement of the concentration of oxygen in steel along the entire thickness thereof just after the rounds of annealing (the measured concentration was named the post-internal-oxidization oxygen amount OI). The post-internal-oxidization oxygen amount of the high-tensile steel sheet, OI, and the basal material oxygen amount, OH, obtained in this way were used to calculate the difference between OI and OH (=OI−OH), and this difference was converted into the amount per unit area (i.e., 1 m²) per side (g/m²). The obtained value was used as the degree of internal oxidization.

<Site of growth of the Si-and-Mn-based crystalline complex oxide existing in steel sheet superficial portions, namely, the portions of the basal steel sheet that are located in direct contact with plating layers and had a thickness of 10 μm, and depositions in grains beneath plating layers in the regions from grain boundaries to a depth of 1 μm>

After the plating layers were dissolved and removed, the cross-section of the steel sheet was observed by SEM, and the depositions in grains were observed by electron diffractometry to determine whether or not the depositions were in their crystalline form and then characterized by EDX and EELS. The depositions were judged to be oxide containing Si and Mn if they were in the crystalline form and composed mainly of Si and Mn. With the magnification of view chosen in the range of 5000 to 20000, observations were made at five positions per steel sheet. Each steel sheet was judged to hold oxide containing Si and Mn if the oxide containing Si and Mn was observed at one or more of the five positions. Then, to determine whether or not the site of growth of internal oxidization was composed of ferrite, cross-sectional SEM was performed, looking for any secondary layer; the site of growth of internal oxidization was judged to be composed of ferrite if no secondary layer was found. As for the oxide existing in the regions from the bottom of each plating layer to a depth of 10 μm, which should be composed of Fe crystal grains in which Si and Mn atoms were so contained as to be distributed in the regions from grain boundaries in the basal steel sheet to a depth of 1 μm, depositions of the oxide were sampled by the extraction replica method from cross-sections, and then the obtained samples were analyzed in a similar way to the one described above.

The results of the evaluation processes described above are presented in Table 2 along with manufacturing conditions.

TABLE 2

| No | Steel No. | [Si] (%) | [Mn] (%) | Cold-rolling reduction rate (%) | Annealing furnace LogPo₂ | −12 + 0.5 × [Si] + 0.2 × [Mn] | −12 + 0.5 × [Si] + 0.2 × [Mn] ≤ LogPo₂ ≤ 4 satisfied at 600 to 900° C. | Alloying temperature (° C.) | Degree of internal oxidization (g/m²) | Presence/ Absence of internal oxide in ≤ 10 μm from bottoms of plating layers | Presence/ Absence of depositions in grains beneath plating layers in ≤ 1 μm from grain boundaries | Amount of plating (g/m²) | Type of plating | Fe content ratio in plating layers (mass %) | Appearance of plating | Capability of retaining plating | TS (MPa) | El (%) | TS × El | Processibility | Class of example |
|---|---|---|---|---|---|---|---|---|---|---|---|---|---|---|---|---|---|---|---|---|---|
| 1 | A | 0.2 | 1.9 | 50 | −12 | −11.5 | x | 500 | 0.001 | x | x | 40 | GA | 10 | x | ○ | 624 | 38.9 | 24274 | OK | Comparative example |
| 2 | A | 0.2 | 1.9 | 50 | −11 | −11.5 | ○ | 500 | 0.02 | ○ | ○ | 40 | GA | 10 | ○ | ○ | 622 | 36.9 | 22952 | OK | Example of the invention |
| 3 | A | 0.2 | 1.9 | 50 | −11 | −11.5 | ○ | — | 0.02 | ○ | ○ | 70 | GI | — | ○ | ○ | 625 | 38.4 | 24000 | OK | Example of the invention |
| 4 | A | 0.2 | 1.9 | 50 | −12 | −11.5 | x | — | 0.001 | x | x | 70 | GI | — | x | ○ | 623 | 38.2 | 23799 | OK | Comparative example |
| 5 | A | 0.2 | 1.9 | 50 | −11 | −11.5 | ○ | 500 | 0.02 | ○ | ○ | 130 | GA | 10 | ○ | x | 626 | 38.9 | 24351 | OK | Comparative example |
| 6 | A | 0.2 | 1.9 | 50 | −12 | −11.5 | x | 500 | 0.01 | ○ | x | 40 | GA | 10 | x | ○ | 628 | 36.4 | 22859 | OK | Comparative example |
| 7 | A | 0.2 | 1.9 | 50 | −9 | −11.5 | ○ | 500 | 0.08 | ○ | ○ | 40 | GA | 10 | ○ | ○ | 626 | 37.4 | 23412 | OK | Example of the invention |
| 8 | A | 0.2 | 1.9 | 50 | −7 | −11.5 | ○ | 500 | 0.31 | ○ | ○ | 40 | GA | 10 | ○ | ○ | 630 | 38.6 | 24318 | OK | Example of the invention |
| 9 | A | 0.2 | 1.9 | 50 | −5 | −11.5 | ○ | 500 | 0.44 | ○ | ○ | 40 | GA | 10 | ○ | ○ | 627 | 36.9 | 23136 | OK | Example of the invention |
| 10 | A | 0.2 | 1.9 | 50 | −3 | −11.5 | x | 500 | 0.78 | ○ | ○ | 40 | GA | 10 | ○ | x | 633 | 35.1 | 22218 | OK | Comparative example |
| 11 | B | 0.2 | 2.0 | 50 | −10 | −11.5 | ○ | 500 | 0.03 | ○ | ○ | 40 | GA | 10 | ○ | ○ | 625 | 36.3 | 22688 | OK | Example of the invention |
| 12 | C | 0.2 | 2.1 | 50 | −10 | −11.5 | ○ | 500 | 0.04 | ○ | ○ | 40 | GA | 10 | ○ | ○ | 623 | 39.4 | 24546 | OK | Example of the invention |
| 13 | D | 1.0 | 2.0 | 50 | −10 | −11.1 | ○ | 500 | 0.05 | ○ | ○ | 40 | GA | 10 | ○ | ○ | 996 | 25.4 | 25298 | OK | Example of the invention |

TABLE 2-continued

| No | Steel No. | [Si] (%) | [Mn] (%) | Cold-rolling reduction rate (%) | Annealing furnace LogPo₂ | ⁻12 + 0.5 × [Si] + 0.2 × [Mn] | ⁻12 + 0.5 × [Si] + 0.2 × [Mn] ≤ LogPo₂ ≤ ⁻4 satisfied at 600 to 900° C. | Alloying temperature (° C.) | Degree of internal oxidization (g/m²) | Internal oxide in ≤10 μm from bottoms of plating layers Presence/Absence | Presence/Absence of depositions in grains beneath plating layers in ≤1 μm from grain boundaries | Amount of plating (g/m²) | Type of plating | Fe content ratio in plating layers (mass %) | Appearance of plating | Capability of retaining plating | TS (MPa) | El (%) | TS × El | Process-ibility | Class of example |
|---|---|---|---|---|---|---|---|---|---|---|---|---|---|---|---|---|---|---|---|---|---|
| 14 | E | 1.9 | 2.1 | 50 | ⁻10 | ⁻10.6 | ○ | 500 | 0.04 | ○ | ○ | 40 | GA | 10 | ○ | ○ | 985 | 24.2 | 23837 | OK | Example of the invention |
| 15 | F | 0.2 | 2.9 | 50 | ⁻10 | ⁻11.3 | ○ | 500 | 0.03 | ○ | ○ | 40 | GA | 10 | ○ | ○ | 756 | 29.8 | 22529 | OK | Example of the invention |
| 16 | G | 0.2 | 2.0 | 50 | ⁻10 | ⁻11.5 | ○ | 500 | 0.02 | ○ | ○ | 40 | GA | 10 | ○ | ○ | 651 | 36.1 | 23501 | OK | Example of the invention |
| 17 | H | 0.2 | 2.1 | 50 | ⁻10 | ⁻11.5 | ○ | 500 | 0.03 | ○ | ○ | 40 | GA | 10 | ○ | ○ | 641 | 39.4 | 25255 | OK | Example of the invention |
| 18 | I | 0.2 | 1.9 | 50 | ⁻10 | ⁻11.5 | ○ | 500 | 0.03 | ○ | ○ | 40 | GA | 10 | ○ | ○ | 632 | 36.7 | 23194 | OK | Example of the invention |
| 19 | J | 0.2 | 1.9 | 50 | ⁻10 | ⁻11.5 | ○ | 500 | 0.03 | ○ | ○ | 40 | GA | 10 | ○ | ○ | 628 | 37.8 | 23736 | OK | Example of the invention |
| 20 | K | 0.2 | 1.9 | 50 | ⁻10 | ⁻11.5 | ○ | 500 | 0.03 | ○ | ○ | 40 | GA | 10 | ○ | ○ | 629 | 38.6 | 24279 | OK | Example of the invention |
| 21 | L | 0.2 | 2.2 | 50 | ⁻10 | ⁻11.5 | ○ | 500 | 0.03 | ○ | ○ | 40 | GA | 10 | ○ | ○ | 638 | 37.2 | 23734 | OK | Example of the invention |
| 22 | M | 0.2 | 2.0 | 50 | ⁻10 | ⁻11.5 | ○ | 500 | 0.03 | ○ | ○ | 40 | GA | 10 | ○ | ○ | 639 | 36.9 | 23579 | OK | Example of the invention |
| 23 | N | 0.2 | 1.9 | 50 | ⁻10 | ⁻11.5 | ○ | 500 | 0.03 | ○ | ○ | 40 | GA | 10 | ○ | ○ | 625 | 37.5 | 23438 | OK | Example of the invention |
| 24 | O | 0.2 | 1.9 | 50 | ⁻10 | ⁻11.5 | ○ | 500 | 0.03 | ○ | ○ | 40 | GA | 10 | ○ | ○ | 623 | 36.9 | 22989 | OK | Example of the invention |
| 25 | P | 0.2 | 1.9 | 50 | ⁻10 | ⁻11.5 | ○ | 500 | 0.03 | ○ | ○ | 40 | GA | 10 | ○ | ○ | 619 | 38.4 | 23770 | OK | Example of the invention |
| 26 | Q | 0.2 | 2.2 | 50 | ⁻10 | ⁻11.5 | ○ | 500 | 0.03 | ○ | ○ | 40 | GA | 10 | ○ | ○ | 1562 | 10.2 | 15932 | NG | Comparative example |
| 27 | R | 2.1 | 2.0 | 50 | ⁻10 | ⁻10.6 | ○ | 500 | 0.21 | ○ | ○ | 40 | GA | 10 | × | × | 628 | 32.5 | 20410 | NG | Comparative example |

TABLE 2-continued

| | | Steel | | Manufacturing conditions | | | | | | | | | | | | | | | |
|---|---|---|---|---|---|---|---|---|---|---|---|---|---|---|---|---|---|---|---|
| | | | | | Annealing furnace | | | | | Internal oxide in ≤10 μm from bottoms of plating layers | | | | | | | | | |
| No | Steel No. | [Si] (%) | [Mn] (%) | Cold-rolling reduction rate (%) | LogPo$_2$ | −12 + 0.5 × [Si] + 0.2 × [Mn] | −12 + 0.5 × [Si] + 0.2 × [Mn] ≤ LogPo$_2$ 4 satisfied at 600 to 900° C. | Alloying temperature (° C.) | Degree of internal oxidization, (g/m$^2$) | Presence/Absence | ≤1 μm from grain boundaries | Presence/Absence of depositions in grains beneath plating layers in ≤1 | Amount of plating (g/m$^2$) | Type of plating | Fe content ratio in plating layers (mass %) | Appearance of plating | Capability of retaining plating | TS (MPa) | El (%) | TS × El | Processibility | Class of example |
| 28 | S | 0.2 | 3.1 | 50 | −10 | −11.3 | ○ | 500 | 0.05 | ○ | ○ | 40 | GA | 10 | × | × | 633 | 31.1 | 19686 | NG | Comparative example |
| 29 | T | 0.2 | 1.9 | 50 | −10 | −11.5 | ○ | 500 | 0.03 | ○ | ○ | 40 | GA | 10 | × | ○ | 628 | 34.4 | 21603 | NG | Comparative example |
| 30 | U | 0.2 | 1.9 | 50 | −10 | −11.5 | ○ | 500 | 0.03 | ○ | ○ | 40 | GA | 10 | × | × | 1366 | 11.2 | 15299 | NG | Comparative example |
| 31 | V | 0.2 | 1.9 | 50 | −10 | −11.5 | ○ | 500 | 0.03 | ○ | ○ | 40 | GA | 10 | ○ | ○ | 659 | 32.7 | 21549 | NG | Comparative example |

As can be seen from Table 2, the GI steel sheets and GA ones made by the method according to the present invention (examples of the invention) are very processible, highly capable of retaining plating during heavy-handed processing, and favorable in terms of the beauty in appearance of plating despite that they are high-strength steel sheets each containing large amounts of Si, Mn, and other oxidizable elements.

On the other hand, the comparative examples are inferior in one or more of the beauty in appearance of plating, processibility, and capability of retaining plating during heavy-handed processing.

INDUSTRIAL APPLICABILITY

Galvanized steel sheets according to the present invention are excellent in terms of processibility, capability of retaining plating during heavy-handed processing, and strength and thus can be used as surface-treated steel sheets for lighter and stronger car bodies. Besides automobiles, they can be used in various industries including home appliances and construction materials, owing to their nature as surface-treated steel sheets obtained by treating basal steel sheets to give antirust properties.

The invention claimed is:

1. A galvanized steel sheet comprising:
- a basal steel sheet containing elements C: 0.01 to 0.15%, Si: 0.001 to 2.0%, Mn: 0.1 to 3.0%, Al: 0.001 to 1.0%, P: 0.005 to 0.060%, and S≤0.01%, all in percent by mass, and Fe and unavoidable impurities as the balance;
- a zinc plating layer formed on both sides of the basal steel sheet with an amount of plating per side in a range of 20 to 120 $g/m^2$;
- a steel sheet superficial portion, located in direct contact with each zinc plating layer and extending from each surface of the basal steel sheet to a depth of 100 μm, with a total amount of the oxides per side in a range of 0.01 to 0.5 $g/m^2$, the oxides being at least one oxide selected from the group consisting of Fe, Si, Mn, Al, and P oxides; and
- a Si and Mn containing crystalline complex oxide region extending from each surface of the basal steel sheet to a depth of 10 μm, which is also located in direct contact with the zinc plating layer, the crystalline complex oxide comprising Fe crystal grains within which Si and Mn atoms are distributed throughout a region from a grain boundary to a depth of 1 μm inside the Fe crystal grain,
- wherein Si and Mn atoms are prevented from diffusing inside basal iron grains and accordingly are prevented from concentrating at surfaces of the basal steel sheet.

* * * * *